Feb. 24, 1970     HIROSHI TERAMACHI     3,497,248
BALL JOINT
Filed Jan. 27, 1969
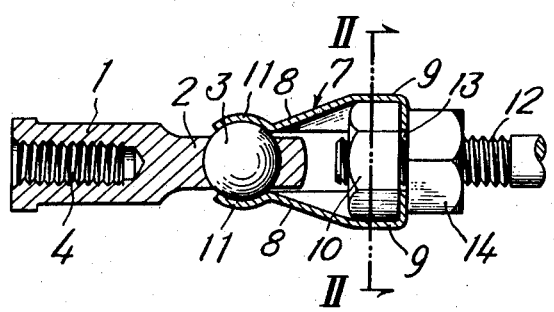
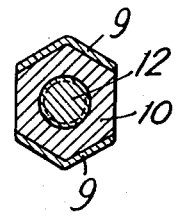
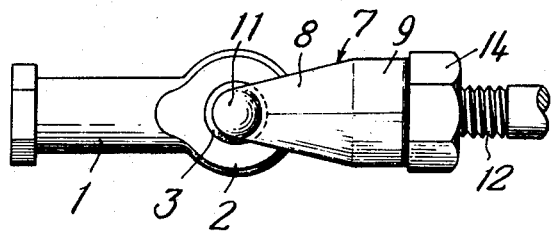
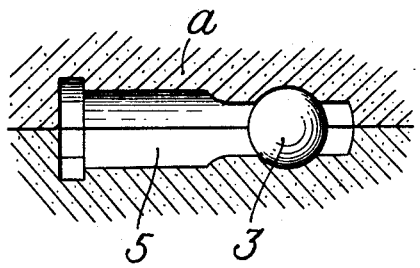
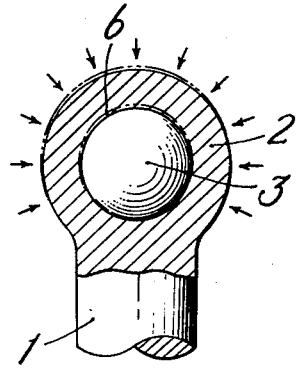
HIROSHI TERAMACHI,
INVENTOR.
BY Wenderoth, Lind & Ponack
Attorneys United States Patent Office 3,497,248
Patented Feb. 24, 1970

3,497,248
BALL JOINT
Hiroshi Teramachi, 23–3 2-chome, Nakamachi
Meguro-ku, Tokyo, Japan
Filed Jan. 27, 1969, Ser. No. 794,068
Claims priority, application Japan, July 31, 1968,
43/65,595
Int. Cl. F16c *11/06;* F16b *7/00*
U.S. Cl. 287—89                    1 Claim

ABSTRACT OF THE DISCLOSURE

This specification discloses a novel type of ball joint, which comprises a rod formed by molding in such a manner that a ready-made steel ball is rotatably embraced within the head portion of said rod. The ball joint also comprises a tong-like connecting plate made of pressed steel sheet and joined to said steel ball. The tong-like connecting plate has a pair of arms which embrace a connecting nut held in place inwardly of the base portions thereof. The pair of arms of said tong-like connecting plate are formed with opposed, bowl-like portions adapted to hold said steel ball which is forced into therebetween, and said bowl-like portions and said steel ball are joined together by spot welding. The ball joint thus provided is much more simplified in construction, easier to manufacture and more reliable in performance than any prior art ball joint, and moreover, the use of the ready-made steel ball which is low in cost leads to the economical advantage of the entire ball joint assembly.

BACKGROUND OF THE INVENTION

This invention relates to a ball joint, and more particularly to a novel type of ball joint in which a rod and a connecting rod are connected together through a ready-made steel ball rotatably disposed in the head portion of said rod and a tong-like connecting plate having the ends of its two arms welded to said steel and also having a connecting nut secured in place inwardly of the base portion of said arms.

According to the prior art the ball joint was complicated in structure and accordingly not only relatively expensive to manufacture but also inefficient in performance.

SUMMARY OF THE INVENTION

It is therefore the primary object of the present invention to provide a ball joint of a high performance which is simple in construction and easy and economical to manufacture.

According to the present invention there is provided a ball joint which comprises a rod formed by molding in such a manner that a ready-made steel ball is rotatably embraced within the head portion of said rod, a tong-like connecting plate made of pressed steel sheet and joined to said steel ball, said tong-like connecting plate having pair of arms embracing a connecting nut held in place inwardly of the base portions thereof, said pair of arms of said tong-like connecting plate being formed with opposed, bowl-like portions adapted to hold said steel ball forced into therebetween, said bowl-like portions and said steel ball being joined together by spot welding.

DESCRIPTION OF THE PREFERRED EMBODIMENT

The invention will now be described more fully with respect to a preferred embodiment thereof as shown in the accompanying drawings, in which:

FIGURE 1 is a front view, in longitudinal cross-section, of the ball joint provided according to an embodiment of the present invention;

FIGURE 2 is a cross-sectional view taken along line II—II of FIGURE 1;

FIGURE 3 is a plan view of the ball joint of FIGURE 1;

FIGURE 4 is a longitudinal sectional view of the mold used for molding the ball joint; and FIGURE 5 is an enlarged view illustrating the manner in which a clearance is provided in the spherical surface portion of the ball joint.

Referring now to FIGURE 1, the ball joint according to the present invention comprises a rod 1 having at one end thereof a head portion 2, in the center of which there is rotatably embraced a ready-made steel ball 3. The rod 1 is formed with an internally threaded connecting hole 4 extending longitudinally toward the other end thereof to receive the corresponding end of another rod (not shown) to be connected thereto. In order that the steel ball 3 may be rotatably embraced within said head portion 2 of said rod 1, use is made of a mold assembly generally indicated by the letter *a* in FIGURE 4, which comprises a mold member 5 having a rod-forming cavity including a spherical cavity of a complementary shape to the steel ball 3 so as to snugly receive the latter thereinto. Before molding, the steel ball 3 is placed within said spherical cavity of said mold 5, and thereafter a charge of molten light alloy or synthetic resin is introduced into said mold 5. After cooled down, the molded material with the steel ball is removed from the mold. The rod 1 thus formed holds the steel ball 3 in the head portion 2 thereof in such a manner as to tighten the steel ball externally thereof, and therefore the rod is struck in its head portion from the exterior thereof as shown by the arrows in FIGURE 5, so that said head portion of the rod 1 is rolled to thereby provide a small clearance 6 between said steel ball 3 and the inner spherical surface of the head portion so as to allow the steel ball 3 to rotate within said spherical cavity in the rod 1.

A tong-like connecting plate 7 made of pressed steel sheet and having a pair of arms 8, as best shown in FIGURE 1, is then connected to the steel ball. The connecting plate 7 has a connecting nut 10 held in place between the base portions 9 of said arms 8 in such a manner that the two adjacent sides of the nut 10 are in close contact with the base portion of each arm 8, as best seen in FIGURE 2. The connection between the steel ball 3 and the connecting plate 7 is achieved by forcing the steel ball into between resilient bowl-like portions 11 formed at the end of each arm 8 in such a shape as to match the curvature of the steel ball and then joining the steel ball and the bowl-like portions with each other by means of spot welding therebetween. A connecting rod 12 is screwed into the connecting nut 9 through an opening 13 formed in the center of the bottom of the connecting plate 7, whereby the connecting rod 12 is connected to the connecting plate 7 by means of a locking nut 14.

As disclosed hereinabove, the ball joint provided according to the present invention comprises a rod 1 and a connecting rod 12 connected to each other through a ready-made steel ball 3 rotatably disposed in the head portion of said rod 1 and a tong-like connecting plate 7 having the ends of its two arms welded to said steel ball and also having a connecting nut 10 fixed in place inwardly of the base portion thereof. It will be readily appreciated that such arrangement ensures simple construction and easy manufacture of the ball joint. Another advantage of the present invention is that the use of the ready-made steel ball leads to a high accuracy and reliability in performance of the ball joint assembly while the low cost of such steel ball results in the economy of the manufacturing cost of the entire ball joint assembly.

While the present invention has been shown and described with respect to a preferred embodiment thereof, it will be apparent to those within the skill of the art that various changes in the details thereof would be possible without departing from the true spirit of the invention as defined in the appended claim.

What is claimed is:

1. A ball joint comprising a rod molded about a ready-made steel ball which ball is rotatably embraced in the end portion of the rod with opposed portions projecting therefrom, a substantially U-shaped connecting plate made of pressed steel sheet and joined to said steel ball, said connecting plate having a pair of spaced arms embracing a connecting nut on another rod and a bight portion held in place about the base portions of said nut, said pair of arms of said connecting plate being formed with opposed bowl-like portions at the free ends thereof and adapted to hold said steel ball forced therebetween, said bowl-like portions and said steel ball therebetween being joined together by spot welding.

References Cited

UNITED STATES PATENTS

| | | | |
|---|---|---|---|
| 916,390 | 3/1909 | Cuno | 287—89 |
| 1,903,863 | 4/1933 | Hayden | 287—59 XR |
| 2,561,969 | 7/1951 | Bowditch | 287—89 |

DAVID J. WILLIAMOWSKY, Primary Examiner

ANDREW V. KUNDRAT, Assistant Examiner

U.S. Cl. X.R.

74—588